United States Patent [19]

Tsutsui

[11] Patent Number: 5,375,189
[45] Date of Patent: Dec. 20, 1994

[54] APPARATUS AND METHOD FOR AUDIO DATA COMPRESSION AND EXPANSION WITH REDUCED BLOCK FLOATING OVERHEAD

[75] Inventor: Kyoya Tsutsui, Kanagawa, Japan

[73] Assignee: Sony Corporation, Japan

[21] Appl. No.: 953,740

[22] Filed: Sep. 29, 1992

[30] Foreign Application Priority Data

Sep. 30, 1991 [JP] Japan ................................. 3-276168
Sep. 30, 1991 [JP] Japan ................................. 3-276169

[51] Int. Cl.$^5$ ............................................. G10L 5/00
[52] U.S. Cl. .................................... 395/2.38; 381/29
[58] Field of Search ......................... 395/2.38; 381/29

[56] References Cited

U.S. PATENT DOCUMENTS 5,040,217 8/1991 Brandenburg et al. ............ 395/2.35
5,185,800 2/1993 Mahieux ................................ 381/29

Primary Examiner—Allen R. MacDonald
Assistant Examiner—M. Sartori
Attorney, Agent, or Firm—Limbach & Limbach

[57] ABSTRACT

A method for compressing a digital audio input signal to provide a recording signal in which the input signal is divided into frames comprising plural samples. Each frame is transformed into a block of spectral coefficients, which are divided into plural bands. For each band, block floating is applied to the spectral coefficients therein; a block floating coefficient is generated; the spectral coefficients are quantized with an adaptive number of bits to provide quantized spectral coefficients; and a word length is generated. Finally, there is added to the recording signal a block of data derived from the block of spectral coefficients and consisting of the quantized spectral coefficients, a main word length and a main block floating coefficient for each band, and a reserve word length at least for each lower frequency band. In a variation, zero bits are allocated to quantize the spectral coefficients in bands higher in frequency than a highest usable band. The block of data consists of the quantized spectral coefficients, at least one word length, and at least one block floating coefficient, for each band up to the highest usable band; and data indicating the number of bands up to the highest usable band.

32 Claims, 14 Drawing Sheets

APPARATUS AND METHOD FOR AUDIO DATA COMPRESSION AND EXPANSION WITH REDUCED BLOCK FLOATING OVERHEAD

FIELD OF THE INVENTION

This invention relates to a method for processing audio signals by block floating and compression.

BACKGROUND OF THE INVENTION

As a high efficiency coding technique for compressing a digital audio signal, it is known to divide digital audio input signal in time into plural frames of a predetermined samples, to transform each frame into spectral coefficients in the frequency domain, and to divide the block of spectral coefficients resulting from transforming a frame into plural frequency bands. The spectral coefficients in each band are processed by block floating and are quantized by adaptive bit allocation.

Block floating is a normalization process applied to a block of data comprising plural words, such as a band of spectral coefficients. Block floating is applied by multiplying each word in the data block by a common value for the data block to improve quantization efficiency. In a typical block floating process, the maximum absolute value of the words in the data block is found and is used as a block floating coefficient common to all the words in the data block. Using the maximum absolute value in the band as the block floating coefficient prevents data overflow because the absolute value of no other word in the data block can be greater than the maximum absolute value. A simplified form of block floating determines the block floating coefficient using a shift quantity, which provides block floating in 6 dB steps.

The data compressor employing block floating generates, for each band, various block floating parameters BF that are transmitted or recorded on a recording medium together with the quantized spectral coefficients, or main information. The block floating parameters include a block floating coefficient SF and a word length WL, which provides information concerning the adaptive bit allocation, indicating the difference between the value of the block floating coefficient SF and the allowable noise level which is determined for each band, taking account of masking.

In the following description, reference will be made to recording on or reproducing from a recording medium. When such references are made, they are to be understood as additionally encompassing transmitting to and receiving from a transmission medium.

Masking is a psychoacoustic phenomenon in which a sound is rendered inaudible, or "masked," by other sounds occurring simultaneously with, or slightly earlier than, or later than, the sound. Masking effects may be classed into time domain masking effects, that is, masking by sounds occurring earlier or later than the masked sound, and concurrent masking effects, which is masking is by simultaneously-occurring sounds having a frequency different from the frequency of the masked sound.

Masking enables a sound to render inaudible any noise within its time or frequency masking range. This means that in the presence of a signal that, when reproduced, produces a sound, a digital encoding system that produces quantizing noise may have quantizing noise levels that are high compared with the noise level that is allowable in the absence of the signal, provided that the quantizing noise lies within the masking range of the sound produced by the signal. Since relatively high levels of quantizing noise are allowable if masked by the sound resulting from the signal, the number of bits required to quantize the signal representing the sound, or parts of the signal, may be significantly reduced.

A critical band is a frequency band that takes advantage of the masking characteristics of the human sense of hearing. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 20 kHz can be divided into, for example, 25 critical bands.

If, for some reason, data is destroyed or lost between the output of the data compressor and the input of a complementary data expander, it is possible to reduce the audible effects of the missing data in the data expander by reducing the signal component in the frequency band corresponding to the missing data to zero.

However, since the block floating parameters BF is related to the spectral coefficients in each band, the effect on sound quality of losing a block floating parameter BF is more noticeable than loss of the main information (i.e., the quantized spectrum signals).

To mitigate the effects of possibly losing a block floating parameter BF, it is known to include the block floating parameters BF in the compressed signal provided by the data compressor twice, so that they are recorded twice on the recording medium. This provides a redundant set of block floating parameters in case a block floating parameter is lost or erroneous.

In the following description, reference will be made to lost data, such as block floating parameters and quantized spectral coefficients on the understanding that this term also covers erroneous or corrupted data, such as block floating parameters and quantized spectral coefficients.

As shown in FIG. 15, the quantized spectral coefficients (main information) are recorded together with the block floating coefficients SF and word length WL as the above-mentioned block floating parameters BF, and are recorded as the block floating coefficients SF1 and the word lengths WL1, respectively, and are recorded a second time as the block floating coefficients SF2 and the word lengths WL2, respectively.

With the above method, since all the block floating parameters BF need to be recorded twice to deal with normal occurrences of data loss, the number of bits allocated to the main information must be reduced to accommodate the additional block floating parameters. Consequently, in systems having a high compression ratio or a low bit rate, a satisfactory sound quality cannot be attained.

In a conventional data compressor, the number of block floating parameters BF recorded per frame of the input signal is usually fixed. FIG. 16 shows how the data corresponding to each frame of the input signal is arranged in the recording signal produced by a conventional data compressor. In the example shown, the values of the block floating parameters BF for the bands to which no bits are allocated must still to be recorded, which reduces the number of bits available for coding the spectral coefficients in the main information. This makes it difficult to achieve a satisfactory sound quality when the compressed signal from the compressor is subject to complementary expansion, and is reproduced. This is especially so in systems having a high compression ratio or a low bit rate.

The system shown in FIG. 17 is also known. In this, no block floating coefficients SF are recorded for those bands to which no bits are actually allocated, i.e., for bands having a word length WL=0. Correspondingly more bits are available for allocation to coding the spectral coefficients. In the example of FIG. 17, the number of recorded block floating coefficients SF is reduced by four, which is the number of bands to which no bits are allocated. In the arrangement shown in FIG. 17, it is still necessary to record the word length WL for all bands, and to determine whether the word length WL of each band is not zero when reading the block floating coefficients SF in the expander.

It is also necessary for the data compressor to calculate the number of bits necessary for quantizing the spectral coefficients in each band by a process that determines masking. The number of bits thus calculated is compared with the total number of bits allocated to the frame, after which, the bit allocation to each band may be adjusted. However, if the change in bit allocation changes whether the block floating coefficient SF of a block is recorded or not, the total number of bits that is allocated to the main information is also changed, which complicates the process of adjusting the bit allocation.

OBJECTS AND SUMMARY OF THE INVENTION

In view of the above-described state of the art, it is an object of the present invention to provide a method for processing an audio signal in which more bits can be allocated to quantized spectral coefficients and which is resistant to data loss.

In view of the above-described state of the art, it is another object of the present invention to provide a method for processing an audio signal wherein the bit allocation may be easily adjusted and wherein the sound quality is not impaired by adjusting the bit allocation.

For accomplishing the above object, the present invention provides a method for compressing a digital audio input signal to provide a recording signal. According to the method, the input signal is divided into frames comprising plural samples. Each frame of plural samples is transformed into a block of spectral coefficients. The block of spectral coefficients is divided into plural bands that include lower frequency bands, and a lowest frequency band. Block floating is applied to the spectral coefficients in each band and a block floating coefficient is generated for each band. The spectral coefficients in each band are quantized with an adaptive number of bits to provide quantized spectral coefficients in each band, and a word length is generated for each band. Finally, a block of data derived from the block of spectral coefficients is added to the recording signal. The block of data derived from the block of spectral coefficients consists of the quantized spectral coefficients, a main word length for each band, a main block floating coefficient for each band, and a reserve word length at least for each of the lower frequency bands.

In a first variation, there is a reserve word length for each band in the block of data derived from the block of spectral coefficients.

In a second variation, the block of data derived from the spectral coefficients that is added to the output signal additionally consists of a reserve block floating coefficient for each of the lower frequency bands.

In a third variation, the method additionally comprises arranging the quantized spectral coefficients sequentially in the block of data derived from the block of spectral coefficients, beginning with the quantized spectral coefficients in the lowest frequency band.

With the arrangement just described, when the block of data derived from the spectral coefficients is added to the recording signal, the block of data derived from the block of spectral coefficients consists of the quantized spectral coefficients, a main word length for each band, a main block floating coefficient for each band, a reserve word length for each of a first number of the lower frequency bands, and a reserve block floating coefficient for each of a second number of lower frequency bands. The second number of lower frequency bands is less than the first number of lower frequency bands.

With the method for processing audio signals according to the present invention, the block floating coefficients for higher frequency bands, which are less critical to the human sense of hearing, are not included in the recording signal twice, which increases the number of bits available for quantizing the spectral coefficients.

Also, only the word lengths for lower frequency bands are recorded twice, so that bits that otherwise would be allocated to the floating coefficients may be allocated to quantizing the spectral coefficients. Further, by arranging the quantized spectral coefficients in the recording signal beginning with lower frequency spectral coefficients, the sound quality impairment resulting from the loss of higher frequency spectral coefficients is reduced because of masking by the lower frequency spectral coefficients.

For further accomplishing the above objects, the present invention additionally provides a method for compressing a digital audio input signal to provide a recording signal. According to the method, the input signal is divided into frames comprising plural samples. Each frame of plural samples is transformed into a block of spectral coefficients. The block of spectral coefficients is divided into plural bands. The plural bands include a lowest frequency band, and a highest frequency band. Block floating parameters are generated. Block floating is applied to the spectral coefficients in each band in response to a block floating parameter. The spectral coefficients in each band are quantized with an adaptive number of bits to provide quantized spectral coefficients in response to a block floating parameter. Zero bits are allocated to the spectral coefficients in bands higher in frequency than a highest usable band. A block of data derived from the block of spectral coefficients is added to the recording signal. The block of data derived from the block of spectral coefficients consists of the quantized spectral coefficients for each band up to the highest usable band, block floating parameters for each band up to the highest useable band, and data indicating the number of bands up to the highest usable band.

If the higher frequency spectral coefficients are not included in the recording signal because these signals make no perceptible contribution to the reproduced audio signal, the block floating parameters for the high frequency bands of the frame, i.e., the block floating coefficient and the word length, are not included in the recording signal. The bits thus saved are allocated to the main information at lower frequencies, which is crucial to the human sense of hearing.

When block floating parameters are omitted from the recording signal, data is included in the recording signal indicating the number of block floating parameters in the recording signal. The number of block floating parameters corresponds to the number of bands up to the highest useable band.

According to the audio data compression method of the present invention, the block parameters for each band are included in the recording signal in each frame for those bands that need such parameters, i.e., for the bands up to the maximum useable band. Block floating parameters for the bands for which the block floating parameters are unnecessary, i.e., for bands above the maximum useable band are omitted from the recording signal, and the bits thus saved are allocated for the coding the lower frequency spectral coefficients in the main information.

The invention also encompasses an apparatus to which the methods of the invention are applied.

DETAILED DESCRIPTION OF THE INVENTION

The preferred embodiments of the present invention will now be described in detail with reference to the drawings.

In a first aspect, the present invention provides a method for compressing a digital audio input signal comprising transforming a frame of the input audio signal TS in the time domain into plural spectral coefficients SP in the frequency domain. The spectral coefficients are divided into plural frequency bands, block floating is applied to each band, and the spectral coefficients in each band are quantized by adaptive bit allocation. The quantized spectral coefficients QSP, the block floating coefficient SF1, and the word length WL1, for all the bands are recorded once. In addition, the block floating coefficients SF2 for the lower frequency bands and the word lengths WL2 for all the bands are recorded a second time.

Figure 1:
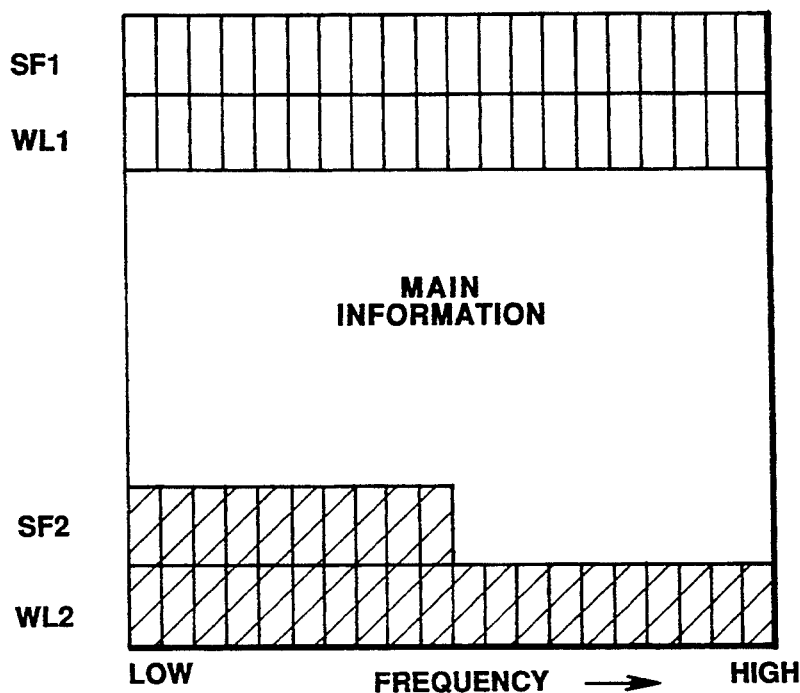
FIG. 1 is a diagrammatic view for illustrating the recording signal produced by the method according to a first aspect of the present invention.

FIG. 1 shows how one block of data in the frequency domain resulting from transforming one frame of the input signal is recorded. The main information shown in FIG. 1 is all the quantized spectral coefficients in the block.

Of the block floating parameters BF, the word lengths WL1 and WL2 for all the bands in the block are recorded twice, the block floating coefficients SF1 for all the bands in the block are recorded once, and the block floating coefficients SF2 for only the lower frequency bands in the block are recorded a second time.

The advantage of recording the block floating coefficients SF2 for only the lower frequency bands a second time will now be explained. Of the block floating parameters BF, the word length WL represents the difference between the block floating coefficient SF and the allowable noise level determined for each band, taking account of masking. The word length indicates information concerning adaptive bit allocation for quantizing the spectral coefficients SP, i.e., the number of bits used to quantize the spectral coefficients in the recorded signal. As a result, if only one of the word lengths WL for the block is lost, none of the quantized spectral coefficients in the block following the quantized spectral coefficients QSP corresponding to the lost word length WL can be read. On the other hand, if one of the block floating coefficients SF for a band of spectral coefficients is lost, only the spectral coefficients SP in the band corresponding to the erroneous or lost block floating coefficient SF cannot be restored. Consequently, the impairment of sound quality resulting from a lost block floating coefficient is less than that resulting from the loss of a word length.

Further, as far as a human listener is concerned, lower frequency audio signals represented by the lower frequency spectral coefficients SP, effectively mask higher frequency signals represented by higher frequency spectral coefficients SP. Consequently, the loss of higher frequency spectral coefficients SP has a minimal effect on sound quality.

Because of this, in the audio signal processing method according to the first aspect of the present invention, impairment of the sound quality of the expanded, decoded and reproduced signal due to lost data can be minimized if, of the block floating parameters BF, the block floating coefficients of only the lower frequency bands are recorded twice. An overall improvement of sound quality can be achieved if the bits thus saved are allocated for quantizing the spectral coefficients more accurately.

Figure 2:
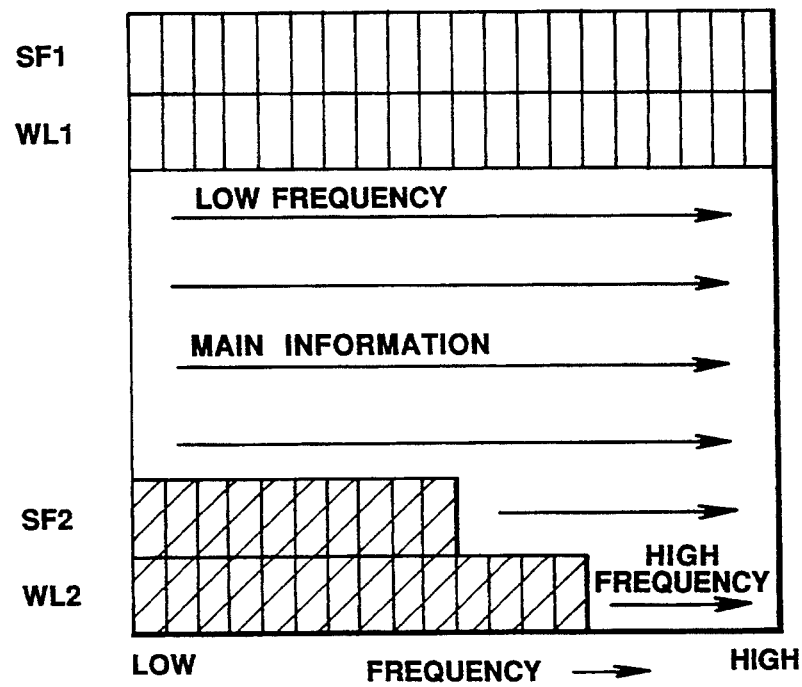
FIG. 2 is a diagrammatic view for illustrating the recording signal produced by the method according to second and third aspects of the present invention.

In the audio signal processing method according to the second aspect of the present invention, the quantized spectral coefficients QSP, are sequentially recorded beginning with the quantized spectral coefficients in the lowest frequency band, as shown by the arrows in FIG. 2. Of the block floating parameters BF, the word length WL1 and block floating coefficient SF1 for each band are recorded once. Additionally, the word lengths WL2 for the lower frequency bands only are recorded a second time. The block floating coefficients are not recorded a second time. Only the block floating coefficient SF1 is recorded.

The third aspect of the present invention is a variation on the second aspect. In the third aspect, the block floating coefficients SF2 for the lower frequency bands are recorded a second time, as shown in FIG. 2. In addition, the number of bands for which the word length WL is recorded twice is set to be larger than the number of bands for which the block floating coefficient SF is recorded twice.

The advantages of the methods according to the second and third aspects of the invention will now be explained. As in the first aspect, as far as a human listener is concerned, lower frequency audio signals represented by the lower frequency spectral coefficients SP, effectively mask higher frequency signals represented by higher frequency spectral coefficients SP. Consequently if higher frequency spectral coefficients SP are lost, the impairment of sound quality is small.

Of the block floating parameters BF, the word length WL represents the difference between the block floating coefficient SF and the allowable noise level determined for each band taking account of masking. The word length indicates information concerning adaptive bit allocation for quantizing the spectral coefficients SP, i.e., the number of bits used to quantize the spectral coefficients in the recorded signal. As a result, if only one of the word lengths WL for the block is lost, none of the quantized spectral coefficients in the recorded signal following the spectral coefficients SP corresponding to the lost word length WL can be read. However, if the quantized spectral coefficients QSP are recorded sequentially, beginning with the lowest frequency band, as in the second aspect of the invention, the quantized spectral coefficients QSP can be correctly read in the decoder up to the frequency band corresponding to the lost word length WL. The correctly expanded lower frequency spectral coefficients mask the defects in the expanded signal resulting from the unexpanded higher frequency spectral coefficients.

If a block floating coefficient SF is destroyed, only the spectral coefficients in the band corresponding to the lost block floating coefficient can not be restored, so that impairment of sound quality is less than if the word length WL of the band is destroyed.

It is seen from above that, in the second embodiment, in which the quantized spectral coefficients QSP are sequentially recorded, beginning with the lowest frequency band, with regard to the block floating parameters BF, only the word lengths WL for the lower frequency bands are recorded a second time, and the block floating coefficients SF are recorded only once. This minimizes the impairment of sound quality caused by the loss of higher frequency spectral coefficients. On the other hand, sound quality is improved by allocating the bits saved by not recording the block floating coefficients SF a second time for quantizing the spectral coefficients SP.

In the third aspect, the block floating coefficient SF is also recorded twice, and the number of bands for which the word length WL is recorded twice is set to be larger than the number of bands for which the block floating coefficient SF is recorded twice. As a result, if a block floating coefficient SF is lost, only the spectral coefficients in the band corresponding to lost block floating coefficient SF cannot be restored. Consequently, the sound quality is impaired less than when the word length WL for the block is lost.

Figure 3:
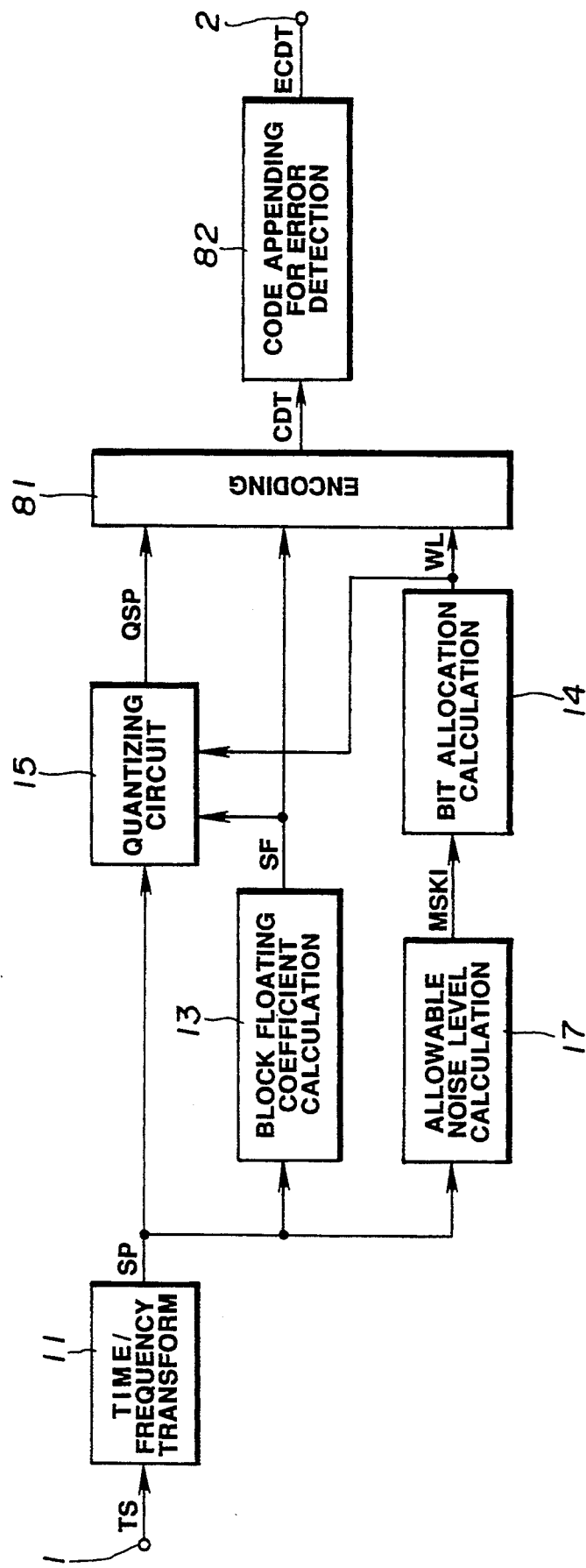
FIG. 3 is a block circuit diagram for illustrating an arrangement of a data compressor to which the methods according to the present invention are applied.

A practical arrangement of an audio signal processing system for carrying out the audio signal processing methods of the above-described aspects of the present invention will next be described. FIG. 3 shows the construction of a data compressor for use in the above-mentioned audio signal processing system. In the data compressor shown in FIG. 3, a digital audio input signal in the time domain TS is supplied to the input terminal 1, and is divided into frames consisting of plural samples. Each frame is transformed into a block of spectral coefficients in the frequency domain. The block of spectral coefficients is divided into plural bands, preferably into 25 critical bands, and the spectral coefficients in each band are processed with block floating and are quantized with an adaptive number of bits. The resulting quantized spectral coefficients QSP, are recorded, and the block floating coefficient SF and the word length WL for each band are recorded as block floating parameters BF, at least some of them twice.

In the arrangement shown in FIG. 3, a digital audio input signal in the time domain is divided by a band-dividing filter into plural frequency ranges, and the resulting frequency range signals are transformed into spectral coefficients in the frequency domain by modified discrete cosine transform (MDCT). The resulting spectral coefficients are compressed by adaptive bit allocation.

The input signal TS is transformed into spectral coefficients SP by the orthogonal transform circuit 11, which preferably uses an MDCT. The orthogonal transform circuit 11 divides the input signal TS into frames and divides each frame into plural frequency ranges. The frequency ranges have a bandwidth that increases with increasing frequency. In the preferred embodiment, the input signal is divided into three frequency ranges. The frames of the frequency range signals may be differently subdivided into time-domain blocks having a different block length in each frequency range.

The spectral coefficients produced by the orthogonal transform circuit 11 are divided into bands, the bandwidths of which are selected to take account of the human sense of hearing. Thus, the spectral coefficients SP are divided into plural bands that become broader towards higher frequencies. Such bands correspond to critical bands.

The spectral coefficients SP from the orthogonal transform circuit 11 are fed into the quantization circuit 15 for quantization. The quantization circuit 15 applies block floating to normalize the spectral coefficients SP in each band and then quantizes the resulting normalized signal with adaptive numbers of bits, taking account of masking.

The block floating coefficients SF used by the quantization circuit 15 to perform block floating are supplied from a block floating coefficient calculating circuit 13. The block floating coefficient calculating circuit 13 receives each block of spectral coefficients SP resulting from the transform of each frame of the frequency range signal, and provides a block floating coefficient for each band.

Each block of spectral coefficients SP is also supplied to the allowable noise level calculating circuit 17 for determining the adaptive number of bits to be used by the quantization circuit 15. In the allowable noise level calculating circuit 17, the allowable noise level MSKI for each band in each block of spectral coefficients is calculated. The calculation takes account of the masking effect of the signal level in the critical band and in neighbouring critical bands to determine the allowable noise level for each critical band, as will be explained below. The allowable noise level MSKI from the allowable noise level calculating circuit 17 is fed into the bit allocation calculating circuit 14 which generates a word length WL for each band in each block of spectral coefficients in response to the allowable noise level MSKI. The quantization circuit 15 performs adaptive quantization of the spectral coefficients SP in each band in response to the allowable noise level for the band.

The allowable noise level calculating circuit 17 and the bit allocation calculating circuit 14 operate in the following manner. First, for each block of spectral coefficients, the allowable noise level calculating circuit 17 determines the energies of the spectral coefficients SP in each band. The energies of the spectral coefficients in each band are preferably calculated by determining the sum of the amplitudes of the spectral coefficients in the band. The peak or mean values of the amplitudes may be used instead of the band energies. The spectrum of the sum of the energies in each band determined by the allowable noise level calculating circuit is called a Burke spectrum.

To taking account of the masking effect of the Burke spectrum, the allowable noise level calculating circuit 17 performs a convolution by summing the Burke spectrum data multiplied by predetermined filter coefficients. To perform the convolution, the circuit includes plural delay elements for sequentially delaying input data, plural multipliers (preferably 25 multipliers, one for each critical band) for multiplying the outputs of the delay elements by filter coefficients and a summing circuit for summing the outputs of the multipliers.

After convolution, deconvolution is carried out to find a masking threshold which represents an allowable noise level. By subtracting the masking threshold from the Burke spectrum, the masking effect of the Burke spectrum on the masking level is found. From this, the allowable noise level, which is fed into the bit allocation calculating circuit 14, is found.

Additionally, when determining the allowable noise level MSKI, data indicating the minimum audible level of the human sense of hearing may be combined with the masking level. A noise having an absolute level less than the minimum audible level is inaudible. The minimum audible level depends on the sound pressure level at which the compressed digital signal, after expansion and conversion to an analog signal, is reproduced. However, in a practical system, there are few, if any, significant differences in the way in which musical program material is fit within the dynamic range provided by a 16-bit PCM system. Thus, it can be said that if the quantization noise is inaudible at frequencies near 4 kHz, which is the frequency at which the ear is most sensitive, then, at other frequencies, quantizing noise lower in level than the level of the minimum audible level curve will also be inaudible.

The allowable noise level MSKI may be further corrected in response to, for example, the equal loudness curve. The equal loudness curve is related yet another characteristic of the human sense of hearing. The equal loudness curve corrects sound pressure levels at different frequencies so that they are perceived as sounding as loud as a pure sound at 1 kHz. According to the equal loudness curve, a sound in the vicinity of 4 kHz is perceived as being as loud as a sound at 1 kHz having a sound pressure level 8 to 10 dB higher. On the other hand, a sound in the vicinity of 50 Hz must have a sound pressure level some 15 dB higher than a sound at 1 kHz sound to be perceived as sounding as loud. Because of this, the allowable noise level must be corrected using the equal loudness curve to adjust the allowable noise level for the loudness sensitivity of the human sense of hearing.

The bit allocation calculating circuit 14 includes a read-only-memory (ROM) in which information concerning bit allocation is stored. The number of bits to be allocated for quantizing the spectral coefficients in each band is read out from the ROM in response to the difference between the allowable noise level MSKI and the band energy. In response to the number of bits allocated to each band, word lengths WL are found for each band in each of the frequency ranges.

The block floating coefficients SF from the block floating coefficient calculating circuit 13, the word lengths WE from the bit allocation calculating circuit 14, and the spectral coefficients QSP quantized by the quantizing circuit 15, are transmitted to the encoding circuit 81. The encoding circuit arranges the data into a recording format such that some of the data, such as some of the word lengths WL and some of the block floating coefficients SF can be recorded twice according to the first, second and to third aspects of the invention. The encoding circuit 81 provides a recording signal as its output data CDT.

The encoding circuit 81 provides the output data CDT to the error code appending circuit 82, which adds error codes, and possibly interleaves, the output data and provides a recording signal to the output terminal 2. A suitable arrangement records the recording signal on a suitable recording medium, such as a magneto-optical disc, a read-only disc, a magnetic tape, or a semiconductor memory.

Figure 4:
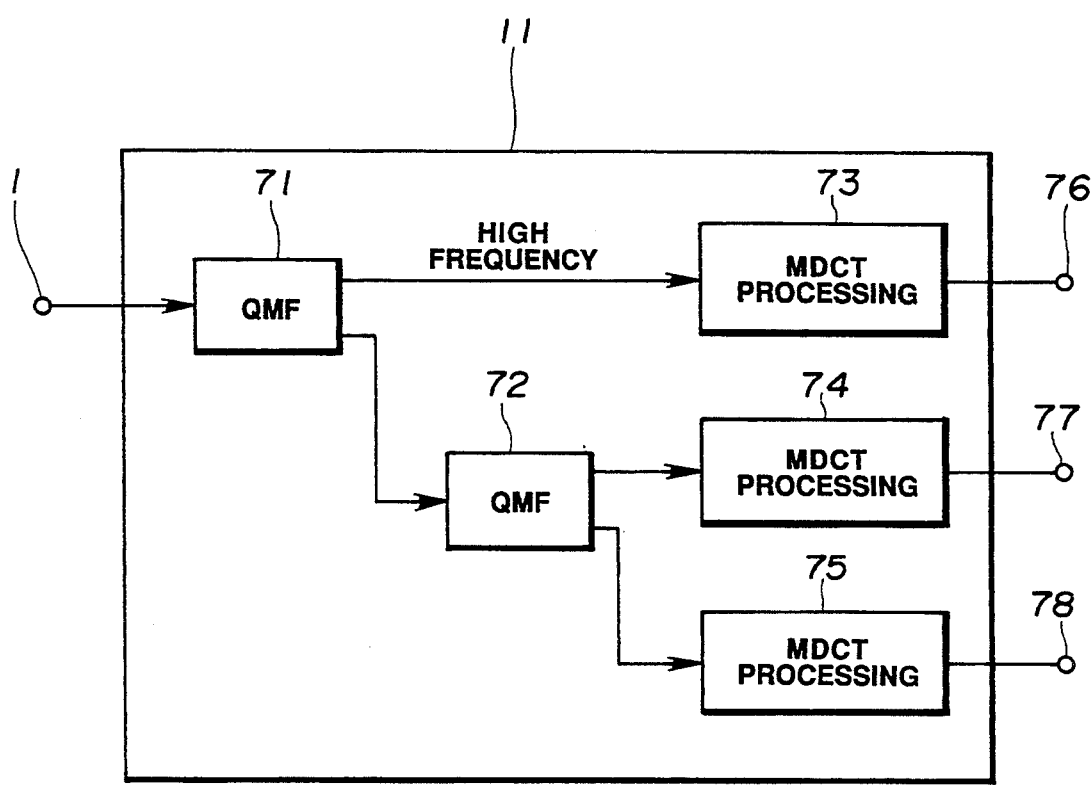
FIG. 4 is a block circuit diagram showing a practical arrangement of the orthogonal transform circuit of the data compressor.

FIG. 4 shows a practical arrangement of the orthogonal transform circuit 11 shown in FIG. 3. The arrangement shown in FIG. 4 includes a band-dividing filter, such as a Quadrature Mirror Filter (QMF), and a Modified Discrete Cosine Transform (MDCT) circuit for compressing the input signal.

Quadrature Mirror Filters are discussed in, for example, R. E. Crochiere, *Digital Coding of Speech in Sub-*

*bands*, 55 BELL SYST. TECH. J., No. 8, (1976). The technique of dividing a frequency spectrum into equal-width frequency ranges is discussed in Joseph H. Rothweiler, *Polyphase Quadrature Filters—A New Subband Coding Technique*, ICASSP 83 BOSTON.

The modified discrete cosine transform (MDCT) is discussed in, for example, J. P. Princen and A. B. Bradley, *Subband/Transform Coding Using Filter Bank Based on Time Domain Aliasing Cancellation*, ICASSP 1987.

The orthogonal transform may alternatively be achieved by, for example, a Fast Fourier Transform (FFT), or a Discrete Cosine Transform (DCT).

In the arrangement shown in FIG. 4, a digital audio input signal TS, such as a PCM signal, is divided in frequency into three frequency ranges. The entire audio frequency range, for example 0 Hz to 20 kHz, is divided into a high frequency range of 10 to 20 kHz, a middle frequency range of 5 to 10 kHz, and a low frequency range of 0 Hz to 5 kHz.

The digital audio input signal TS, for example, an audio PCM signal in the frequency range of 0 Hz to 20 kHz, is supplied to the input terminal 1. The input signal TS is divided by the band dividing filter 71, preferably a QMF, into, e.g., a high frequency range from 0 Hz to 10 kHz, and a frequency range from 10 to 20 kHz. The signal in the frequency range from 0 Hz to 10 kHz is further divided by the band dividing filter 72, preferably a QMF, into a low frequency range from 0 Hz to 5 kHz and a middle frequency range from 5 of 10 kHz. The frequency range signal for the high frequency range from the filter 71, the frequency range signals for the middle frequency range and the low frequency range from the filter 72 are fed into the MDCT circuits 73, 74, and 75, respectively, for MDCT processing. The spectral coefficients derived from each of the frequency range signals by the MDCT circuits 73, 74 and 75 are fed to the output terminals 76, 77 and 78, respectively.

In the MDCT circuits 73 through 75, the frames of the frequency range signals subject to orthogonal transform processing are preferably divided into blocks, and the blocks of the frequency range signals are orthogonally transformed. In the higher frequency ranges, the frames are divided into blocks. This provides a finer time resolution in the higher frequency ranges. For example, the blocks of the frequency range signals subject to the orthogonal transform are such that a block consisting of a whole frame of 256 samples is transformed in the low frequency range and the middle frequency range, whereas the frame is divided into two 128-sample blocks, each of which is orthogonally transformed, in the high frequency range. This way, a more uniform distribution of spectral coefficients among the critical bands is obtained.

When the level a frequency range signal changes rapidly, the frames of that frequency range signal can be further divided to increase further the time resolution of the orthogonal transform. The frames are preferably divided by two raised to a positive integral power, including 0, i.e., divided by 1, 2, 4, 8, etc.

Figure 5:
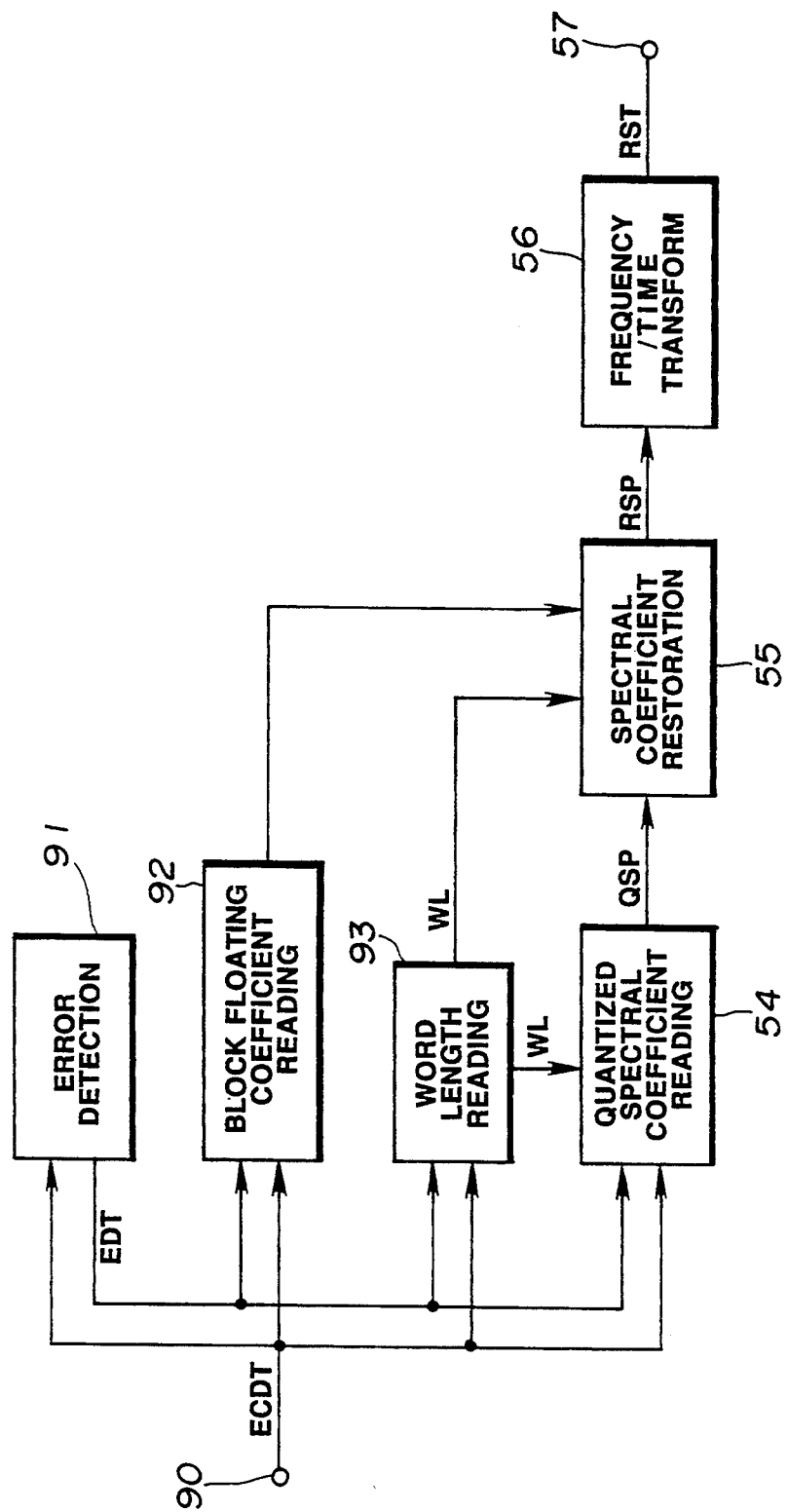
FIG. 5 is a block circuit diagram showing an arrangement of a complementary data expander.

FIG. 5 shows an arrangement of a data expander complementary to data compressor shown in FIG. 3. In the arrangement shown in FIG. 5, the compressed digital signal with appended error correction codes ECDT, which will normally have been reproduced from a recording or transmission medium, is supplied to the input terminal 51. From the input terminal 51, the compressed digital signal with error correction codes ECDT is supplied to the error detection circuit 91 which detects errors in the compressed digital signal in response to the error codes. An error detection signal EDT is supplied from the error detection circuit 91 to the quantized spectral coefficient signal reading circuit 54, the block floating coefficient reading circuit 92, and to the word length reading circuit 93.

The compressed digital signal with error correction codes ECDT is also fed to the block floating coefficient reading circuit 92, where the block floating coefficients SF of the block floating parameters BF are read or fetched; to the word length reading circuit 93, where the word lengths WL of the block floating parameters BF are read or fetched; and to the quantized spectral coefficient reading circuit 54, where the quantized spectral coefficients are read or fetched from the digital signal ECDT in response to the word lengths WL from the word length reading circuit 93. Signal processing in the circuits 92, 93 and 54 is performed in response to the error detection signal EDT.

The quantized spectral coefficients from the quantized spectral coefficient reading circuit 54, the block floating coefficients SF from the block floating coefficient reading circuit 92, and the word lengths WL from the word length reading circuit 93 are transmitted to the spectral coefficient restoring circuit 55 which extracts the spectral coefficients in response to the supplied signals. Specifically, in response to the block floating coefficients SF and the word lengths WL, the quantized spectral coefficients QSP read from the compressed digital signal are restored as restored spectral coefficients RSP, which approximate the original spectral coefficients SP in the compressor. The restored spectral coefficients RSP from the spectral coefficient restoring circuit 55 are transformed into flames of samples in the time domain RTS by an inverse orthogonal transform circuit 56. The frames of samples in the time domain are fed as a digital output signal to the output terminal 57.

Figure 6:
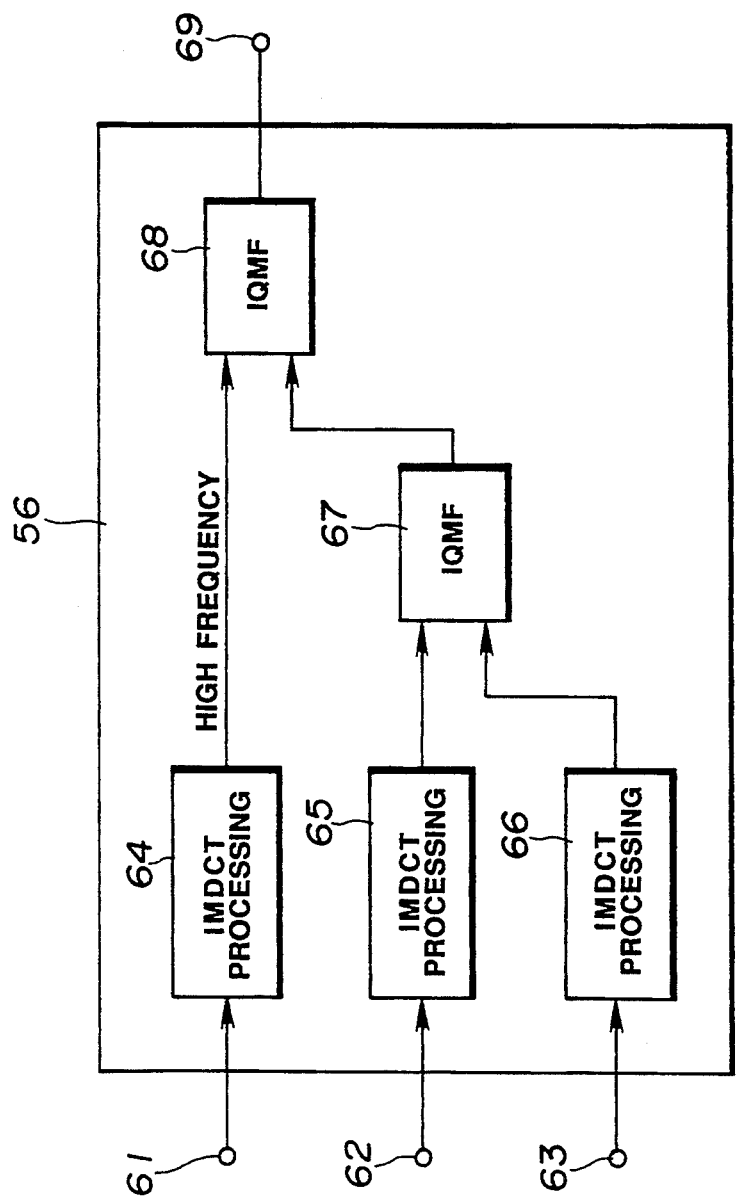
FIG. 6 is a block circuit diagram showing a practical arrangement of the orthogonal transform circuit of the expander.

FIG. 6 shows a practical arrangement of the inverse orthogonal transform circuit 56 of the expander 56 shown in FIG. 5. In FIG. 6, the restored spectral coefficients RSP in each band for each block of spectral coefficients are supplied via the input terminals 61, 62 and 63 to the inverse transform circuits 64, 65 and 66, respectively. The inverse transform circuits 64, 65 and 66, which are preferably inverse modified discrete cosine transform (IMDCT) circuits, transform where the restored spectral coefficients in the frequency domain are transformed into flames of samples of frequency range signals in the time domain. The three frequency range signals are synthesized by the inverse QMF (IQMF) circuits 67 and 68 to provide a full frequency range digital output signal to the output terminal 69.

Figure 7:
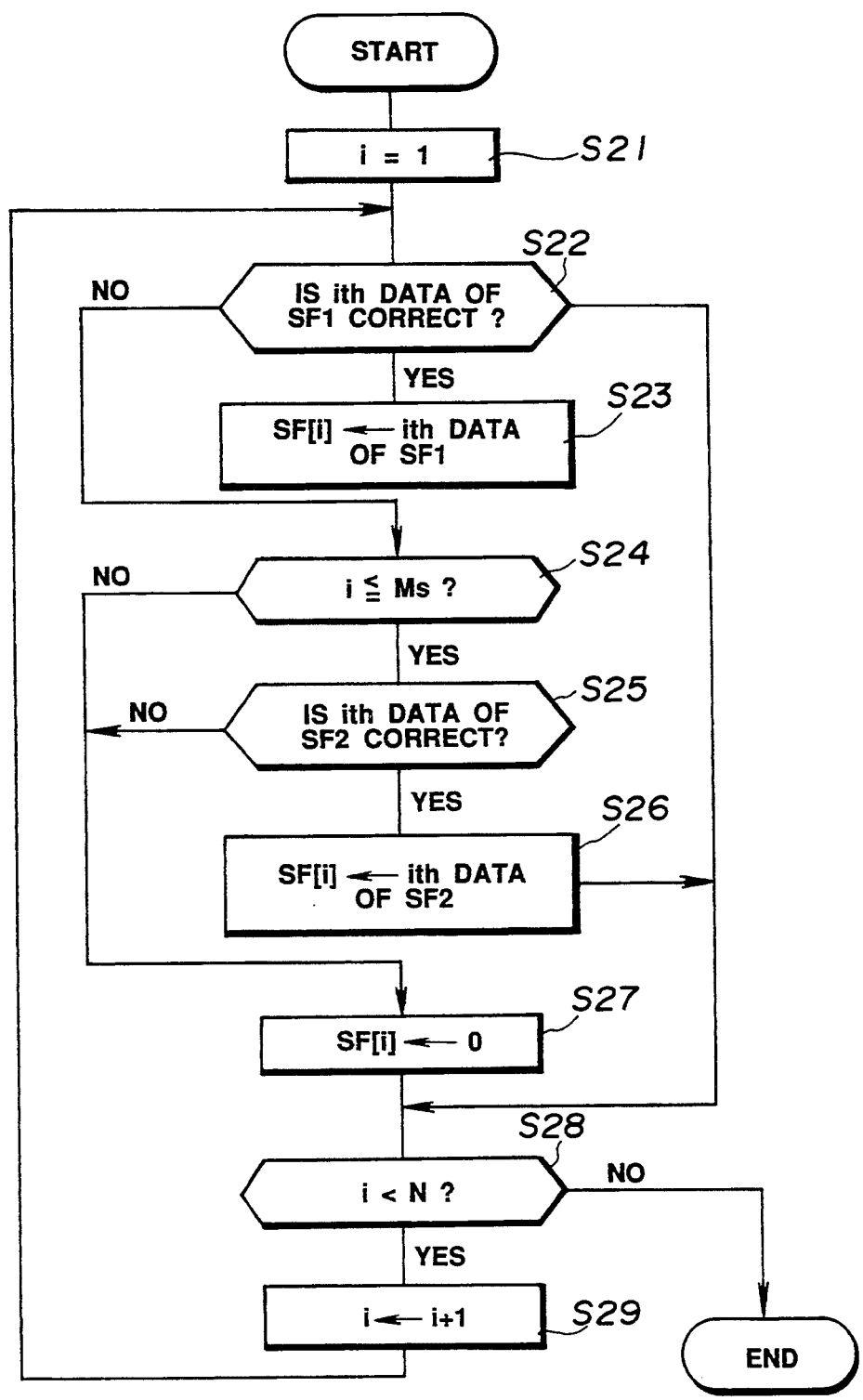
FIG. 7 is a flow chart for illustrating the block floating coefficient reading sequence in the block floating coefficient reading circuit in an expander according to the first to sixth aspects of the invention.

FIG. 7 is a flow chart showing how the block floating coefficient reading circuit 92 in an expander incorporating the first through third aspects of the invention reads the block floating coefficients SF. In this example, the block floating coefficient reading circuit 92 reads N block floating coefficients SF.

Referring to FIG. 7, and also to FIGS. 1 and 2, the number i of block floating coefficients SF is initialized to 1 at step S21. In step S22, it is determined whether the i-th main block floating coefficient SF1 (FIGS. 1 or 2) is correct, with reference to the error detection signal EDT. If i-th main block floating coefficient is correct, i.e., if the result in step S22 is YES, control proceeds to step S23, where the i-th block floating coefficient SF1 is made the i-th element of the array SF[i]. Control then proceeds to step S28.

If the main block floating coefficient SF1 is determined to be incorrect at step S22, control proceeds to step S24. At step S24, it is determined whether the number i is not greater than the maximum number Ms of reserve block floating coefficients SF2 (i.e., $i \leq Ms$). If the result is YES, control proceeds to step S25. At step S25, it is determined whether the i-th reserve block floating coefficient SF2 (FIGS. 1 or 2) is correct. If the reserve block floating coefficient SF2 data is determined to be correct, i.e., if the result is YES, control proceeds to step S26, where the i-th block floating coefficient SF2 is made the i-th element of the array SF[i]. Control then proceeds to step S28.

If the result of step S24 is NO, or if reserve block floating coefficient SF2 is determined to be incorrect at step S25, i.e., if the result in step S25 is NO, control proceeds to step S27, where 0 is made the i-th element of the array SF[i]. Control then proceeds to step S28.

At step S28, it is determined whether the number i is smaller than the number N ($i < N$). If the result is YES, control proceeds to step S29, where i is incremented by 1. Control then proceeds to step S22, and the process is repeated. If the result of step S28 is NO, the processing is stopped.

Figure 8:
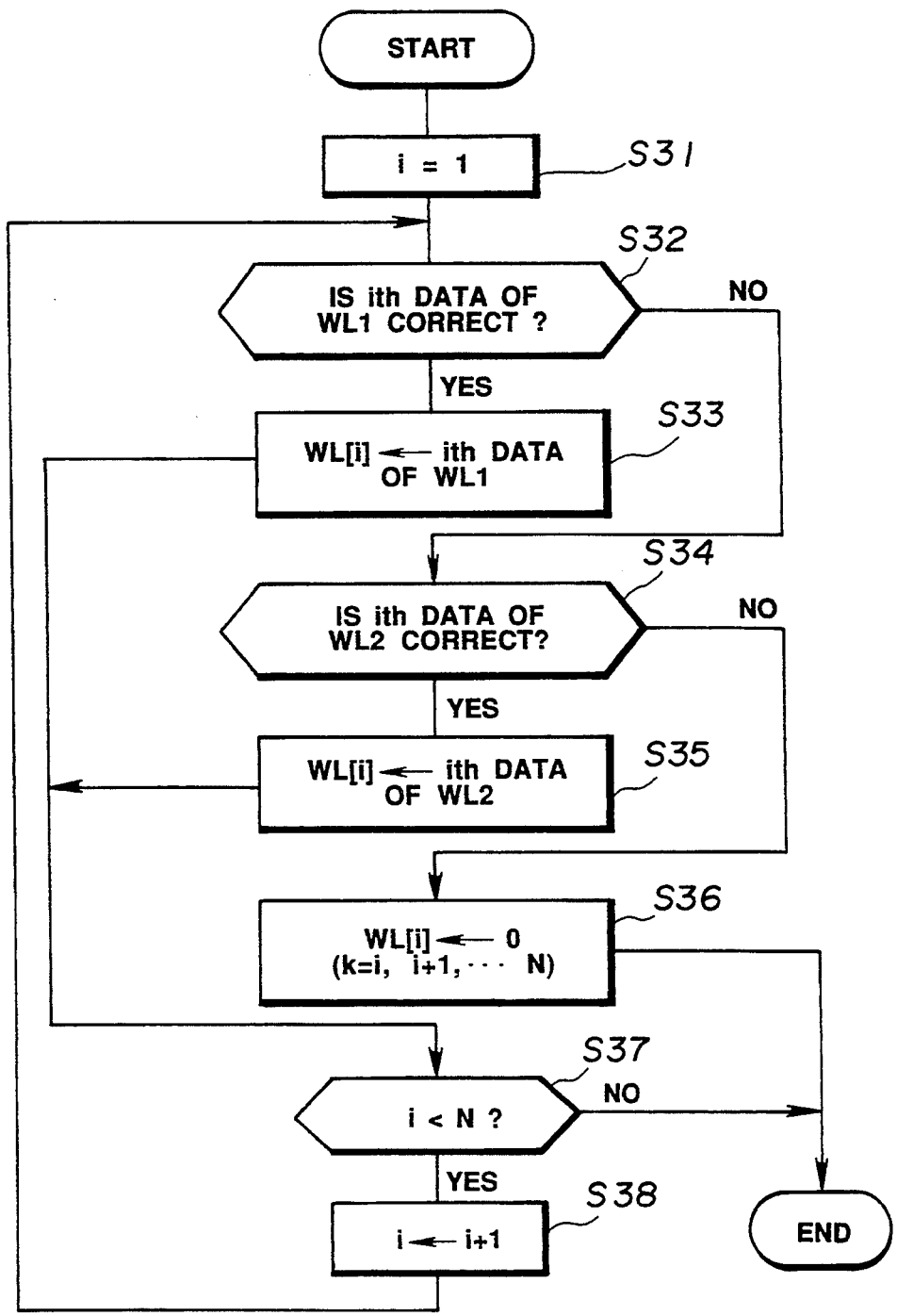
FIG. 8 is a flow chart for illustrating the word length reading sequence in the word length reading circuit in an expander according to the first aspect of the invention.

FIG. 8 shows is flow chart showing how the word length reading circuit 93 of an expander incorporating the first aspect of the invention reads the word lengths WL. The word length reading circuit 93 reads N word lengths WL.

In the flow chart of FIG. 8, the number i of the word length WL is initialized to 1 at step S31. At step S32, it is determined whether the i-th main word length WL1 of the word lengths shown in FIG. 1 is correct, with reference to the error detection signal EDT. If the data is correct, that is, if the result of step S32 is YES, control proceeds to step S33 where the i-th word length WL1 is made the i-th element of the array WL[i]. Control then proceeds to step S37. If the main word length WL1 is determined to be incorrect, i.e., if the result in step S32 is NO, control proceeds to step S34.

At step S34, it is determined whether the reserve i-th word length WL2 of FIG. 1 is correct, with reference to the error detection signal EDT. If the reserve i-th word length WL2 is determined to be correct, i.e., if the result in step S34 is YES, control proceeds to step S35, where the i-th word length WL2 is made the i-th element of the array WL[i]. Control then proceeds to step S37.

If the result of step S34 is NO, control proceeds to step S36, the k-th element of the array WL[k]is set to 0, where k=i, i+1, ... N, after which, processing is stopped.

At step S37, it is determined whether the number i is less than the number N ($i < N$). If the result is YES, control proceeds to step S38, where i is incremented by 1 to return to step S32. If the result at step S37 is NO, the processing is terminated.

Figure 9:
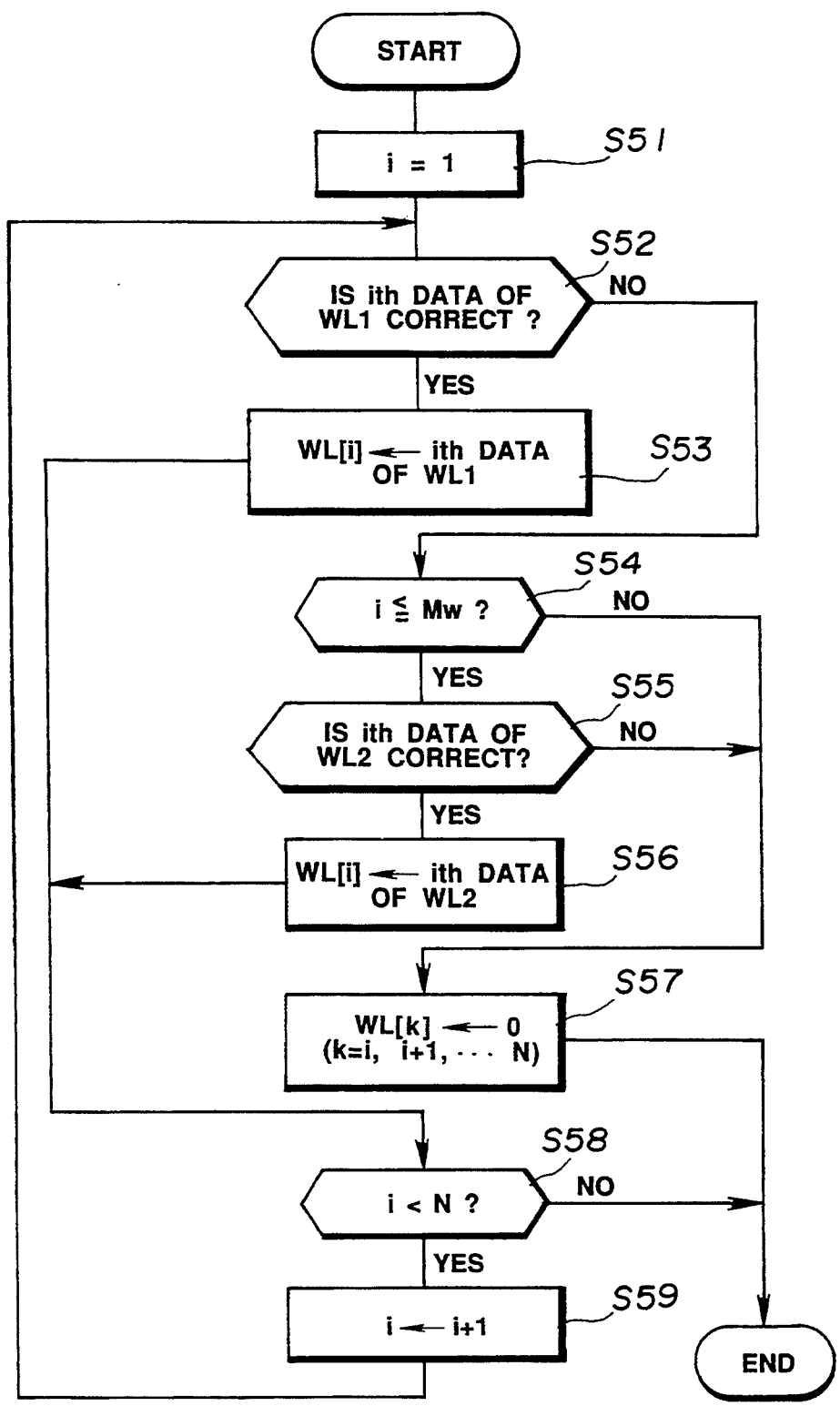
FIG. 9 is a flow chart for illustrating the word length reading sequence in the word length reading circuit in an expander according to the second and sixth aspects of the invention.

FIG. 9 is a flow chart showing how the word length reading circuit 93 of an expander incorporating the second and third aspects of the invention reads the word lengths WL. The word length reading circuit 93 reads N word lengths WL.

Referring to the flow chart of FIG. 9, and to FIG. 2, the number i of the word length WL is initialized to 1 at step S51. At step S52, it is determined whether the main i-th word length WL1 of FIG. 2 is correct, with reference to the error detection signal EDT. If the main i-th word length WL1 is correct, i.e., if the result in step S52 is YES, control proceeds to step S53 where the i-th word length WL1 is made the i-th element of the array WL[i]. Control then proceeds to step S58. If the main i-th word length WL1 data is found to be incorrect, i.e., if the result in step S52 is NO, control proceeds to step S54.

At step S54, it is determined whether the number i is not more than the number Mw of reserve word lengths WL2 ($i \leq Mw$). If the result is YES, control proceeds to step S55 where it is determined whether the i-th reserve word length WL2 is correct. If the i-th reserve word length WL2 is determined to be correct, i.e., if the result in step S55 is YES, control proceeds to step S56, where the i-th reserve word length WL2 is made the i-th element of the array WL[i]. Control then proceeds to step S58.

If the result at step S54 is NO, or if the i-th reserve word length WL2 is determined to be incorrect, that is if the result in step S55 is NO, control proceeds to step S57. At step S57, the k-th element of the array WL[k]is set to 0, where k=i, i+1 ... N, after which processing is stopped.

At step S58, it is determined whether the number i is smaller than the number N ($i < N$) and, if it is smaller, i.e., if the result in step S58 is YES, control proceeds to step S59, where the number i is incremented by 1, and control is returned to step S52. If the result of step S58 is NO, processing is stopped.

Figure 10:
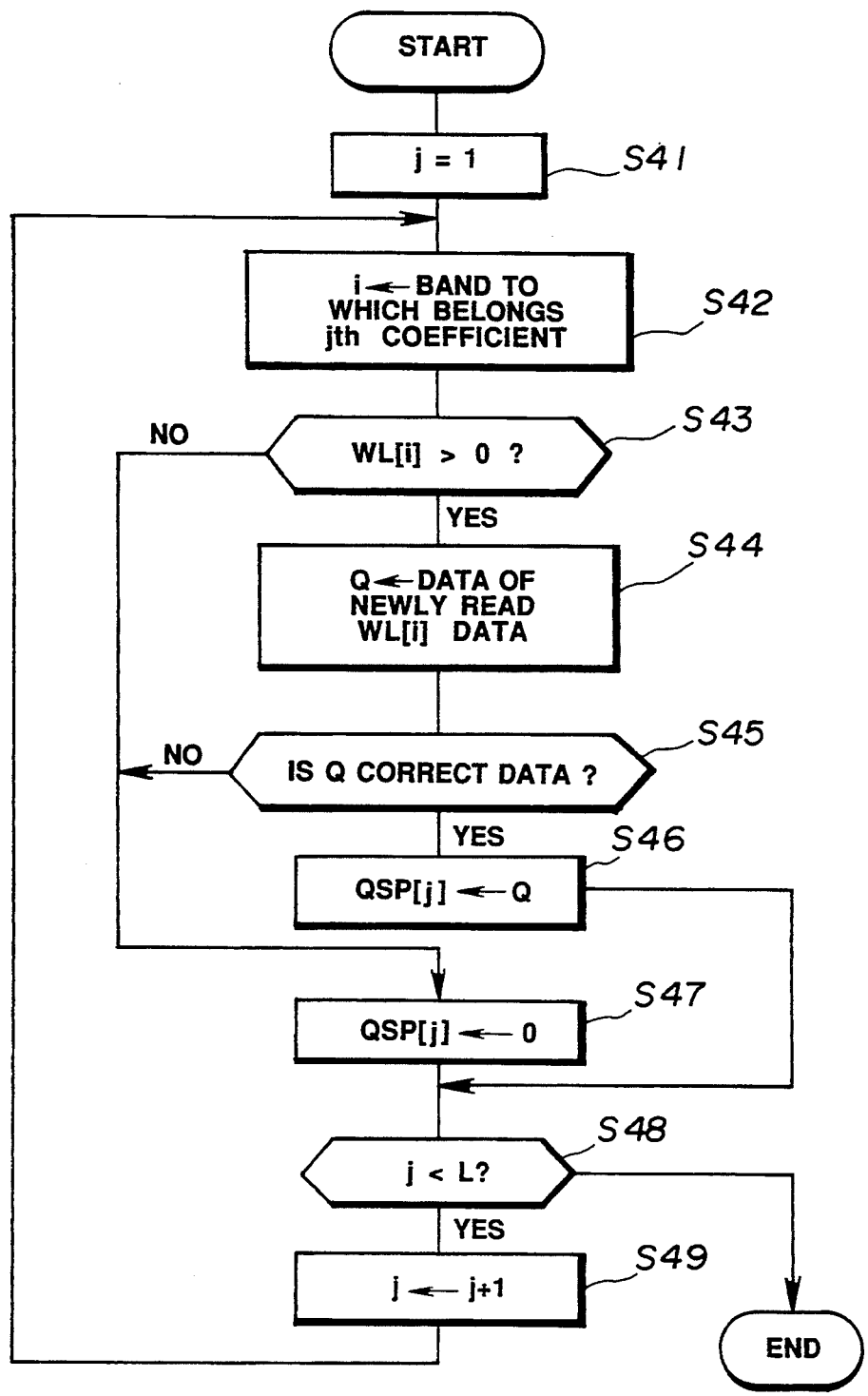
FIG. 10 is a flow chart for illustrating the quantized spectral coefficient reading sequence in the quantized spectral coefficient reading circuit in an expander according to the first through sixth aspects of the invention.

FIG. 10 is a flow chart showing the operation of the quantized spectral coefficient reading circuit 54 in an expander incorporating the first through third aspects of the invention. The quantized spectral coefficient reading circuit 54 reads L bands of quantized spectral coefficients QSP.

In the flow chart of FIG. 10, the spectral coefficient number j is initialized to 1 at step 41. At step S42, the band to which the j-th quantized spectral coefficient QSP is set to i. At step S43, it is determined whether the i-th element of the array WL[i] of word lengths WL is greater than 0 (WL[i]>0). If the result at step S43 is YES, program proceeds to step S44.

At step S44, the value of the i-th element of the array WL[i] of word lengths WL is substituted into the variable Q. At step S45, it is determined whether Q is correct. If the result is YES, control proceeds to step S46 where Q is made the j-th element of the array QSP[j] of quantized spectral coefficients QSP. Control then proceeds to step S48.

If the result at step S43 is NO, or if Q is determined to be incorrect, i.e., if the result in step S45 is NO, control proceeds to step S47, where the j-th element of the array QSP[j] is set to 0, before control proceeds to step S48.

At step S48, it is determined whether the number j is less than the number of quantized spectral coefficients L ($j < L$). If the result is YES, control proceeds to step S49, where the number j is incremented by 1, before control proceeds to step S42. If the result at step S48 is NO, processing is stopped.

In the above-described methods for compressing digital audio signals according to the present invention, of the block floating parameters, only the block floating coefficients of the lower frequency band are recorded twice, so that the amount of block floating parameter data recorded twice is reduced compared with the conventional method. Consequently, more bits may be allocated to quantizing the spectral coefficients themselves to provide an improved sound quality. Moreover, the impairment of sound quality caused by a loss of data is less noticeable than with the conventional method.

Also, in the above-described methods for compressing digital audio signals according to the present invention, the quantized spectral coefficients are sequentially recorded, beginning with the spectral coefficients in the lowest frequency band, and, of the block floating parameters, only the word lengths relating to the lower frequency bands are recorded twice. If the block floating coefficients are also recorded twice, the number of bands for which the word length is recorded twice is set to be greater than the number of bands for which the block floating coefficient is recorded twice. This way, the parameters that are crucial for providing an acceptable sound quality are recorded twice, while noticeable impairment of sound quality due to data loss is minimized. Further, since the volume of the twice-recorded data is less than that with the conventional method, more bits may be allocated to quantizing the spectral coefficients, which provides a higher sound quality.

Figure 11:
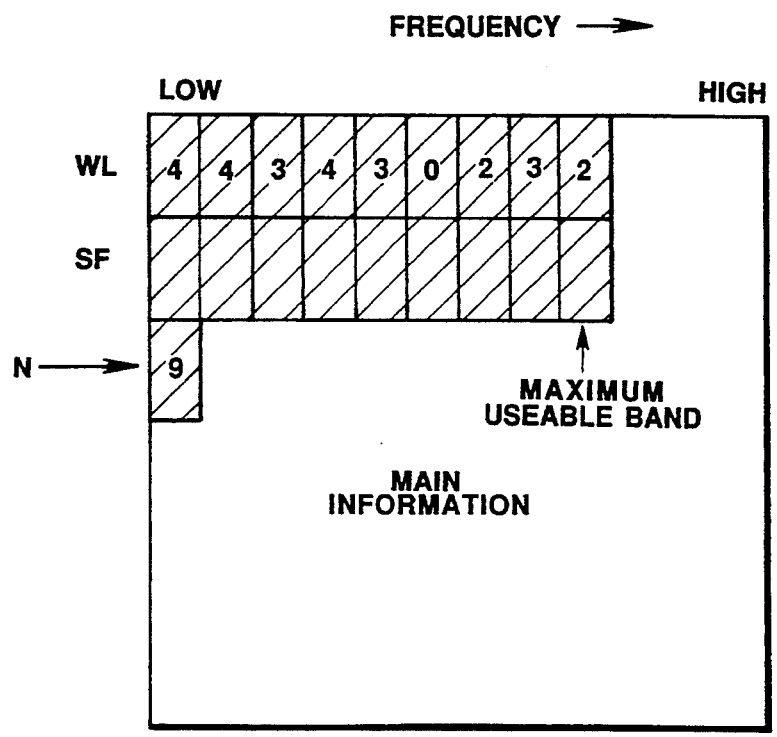
FIG. 11 is a diagrammatic view for illustrating data recording according to a fifth aspect of the present invention, in which higher frequency spectral coefficients are not recorded.

In a fourth aspect, the present invention provides a method for compressing audio signals in which a frame of an input signal in the time domain TS is transformed into spectral coefficients SP in the frequency domain. The block of spectral coefficients resulting from transforming a frame of the input signal is divided into plural bands, block floating is applied to the spectral coefficients in each band, and the block floating processed spectral coefficients in each band are quantized by adaptive bit allocation. A compressed digital signal that includes the quantized spectral coefficients together with block floating parameters BF, including block floating coefficients SF and word lengths WL, is recorded. In this method, as shown in FIG. 11, the block floating parameters for each band for each frame are recorded beginning with those for the lowest frequency band and ending with the highest frequency band for which such parameters are needed. Also recorded is data indicating the number of block floating parameters recorded.

FIG. 11 shows a how the data resulting from transforming one frame of the input signal is recorded. The main information shown in FIG. 11 is the quantized spectral coefficients.

The advantages of the fourth aspect of the invention will now be explained. The minimum audible level of the human sense of hearing as described above is high at frequencies above about 10 kHz. Additionally, high level, lower frequency signals have an ability to mask higher frequency signals, so that sound quality impairment resulting from levels of quantizing noise at high frequencies considerably higher than those at lower frequencies of, e.g. less than 10 kHz are hardly perceived. Above all, if the spectral coefficients for frequencies greater than 15 kHz are deleted by allocating zero quantizing bits to them, the resulting difference in sound quality is hard for the human sense of hearing to discern.

For the reasons just stated, the block floating parameters BF, i.e., the block floating coefficients SF and the word length WL corresponding to the number of allocated quantizing bits, can be recorded for each frequency band only for those bands up to the highest frequency band that needs such parameters BF. In other words, block floating parameters need only be recorded for the part of the audio frequency spectrum that is crucial to the sense of hearing, and which lies below a certain frequency. Since the highest frequency band that needs block floating parameters may change from one frame of the input signal to the next, the number of block floating parameters recorded may change from one frame to the next. In this way, it is possible to allocate more bits to quantizing the lower frequency spectral coefficients that are crucial to the human sense of hearing, and hence that cannot be omitted. This provides a further improvement in sound quality.

Because the number of block floating parameters BF recorded changes from one frame to the next, data indicating the number N of block floating parameters BF recorded is included in each block of the recorded digital signal resulting from transforming one frame of the input signal. The volume of the data indicating the number N is small. If tens of block floating parameters BF are recorded per block, 7 bits suffices to indicate N. On the other hand, if each frame includes only two bands, 1 bit suffices to indicate N.

Thus, according to the fourth aspect of the invention, if high frequency spectral coefficients corresponding to a frame of the input signal need not be recorded because they are inaudible, the bits formerly required for the block floating parameters BF of the high frequency bands to which zero bits are allocated can be allocated to the main information of the lower frequency bands. In this case, the lower frequency block floating parameters BF and the main information are recorded together with the number N of block floating parameters BF recorded for the frame.

Figure 12:
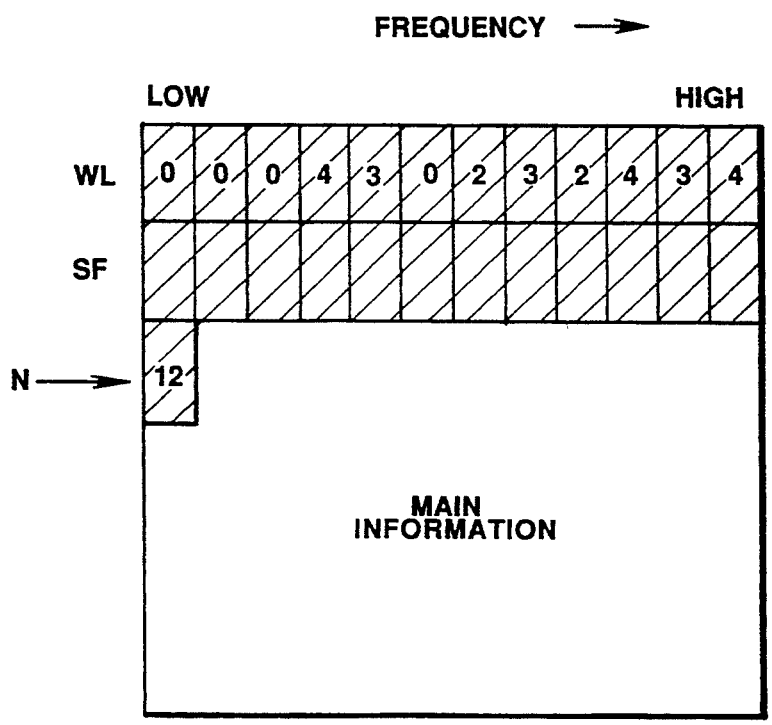
FIG. 12 is a diagrammatic view for illustrating data recording according to a sixth aspect of the present invention, in which higher frequency spectral coefficients are recorded.

If spectral coefficients in the lower frequency bands have a relatively low level, and the spectral coefficients in the higher frequency bands have a relatively high level, and the high frequency spectral coefficients are omitted from the compressed signal, the resulting impairment of sound quality is readily noticed. In such cases, the high frequency spectral coefficients and block floating parameters are included in the recording signal, as shown in FIG. 12.

Figure 13:
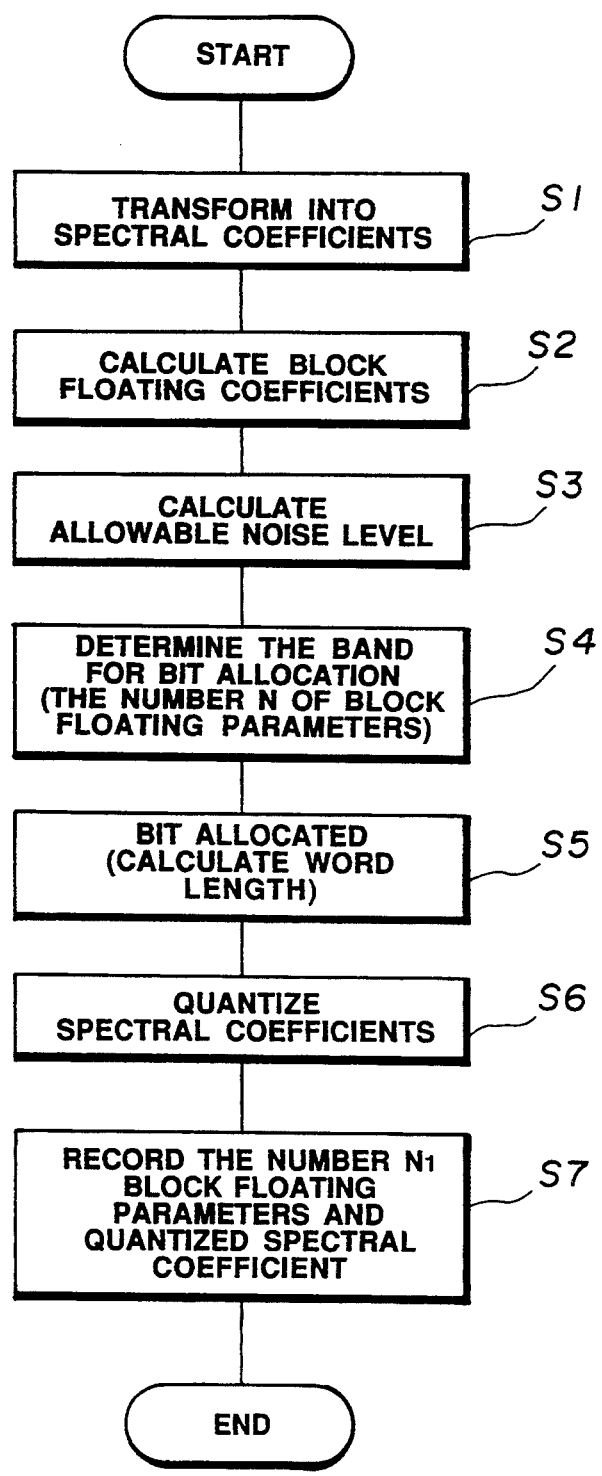
FIG. 13 is a flow chart for illustrating the processing by the data compressor.

FIG. 13 is a flow chart showing the signal processing in the data compressor shown in FIG. 3. In the data compressor shown in FIG. 3, this flow chart can be carried out using the circuit blocks shown in FIG. 3, but it can also be carried out using a digital signal processor, and associated memories.

In FIG. 13, at step S1, the orthogonal transform circuit 11 transforms each frame of a digital audio input audio signal TS in the time domain into a block of spectral coefficients SP. After step S1, control proceeds to step S2 where the block floating coefficient calculating circuit 13 calculates a block floating coefficient SF for each band of spectral coefficients. At step S73, the masking calculating circuit 17 performs the allowable noise level calculation and, at step S74, the bands to which bits are to be allocated, and the number N of block floating parameters BF are determined. At step S75, the bit allocation calculating circuit 14 calculates quantizing bit allocation and determines the word length WL for each band. At step S76, the spectral coefficient quantizing circuit 15 quantizes the spectral coefficients. Finally, at step S77, the data indicating the number N of block floating parameters BF for the bands which need to be recorded, the block floating parameters BF, and the quantized spectral coefficients QSP are encoded into a compressed digital signal by the data encoding circuit 82.

Figure 14:
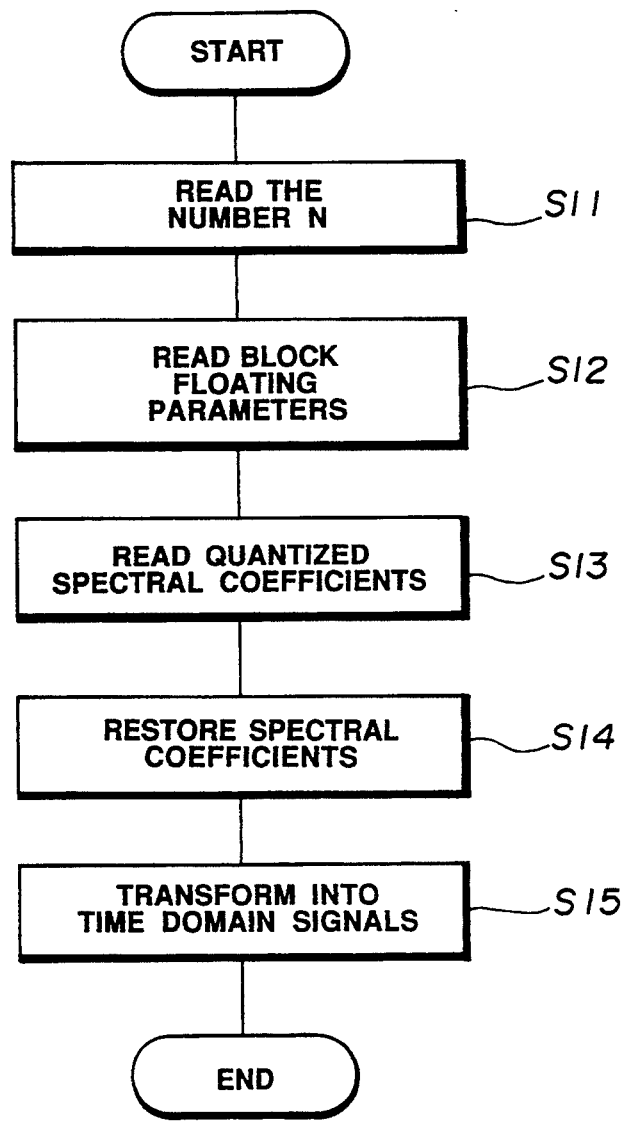
FIG. 14 is a flow chart for illustrating the processing by the data expander.
Figure 15:
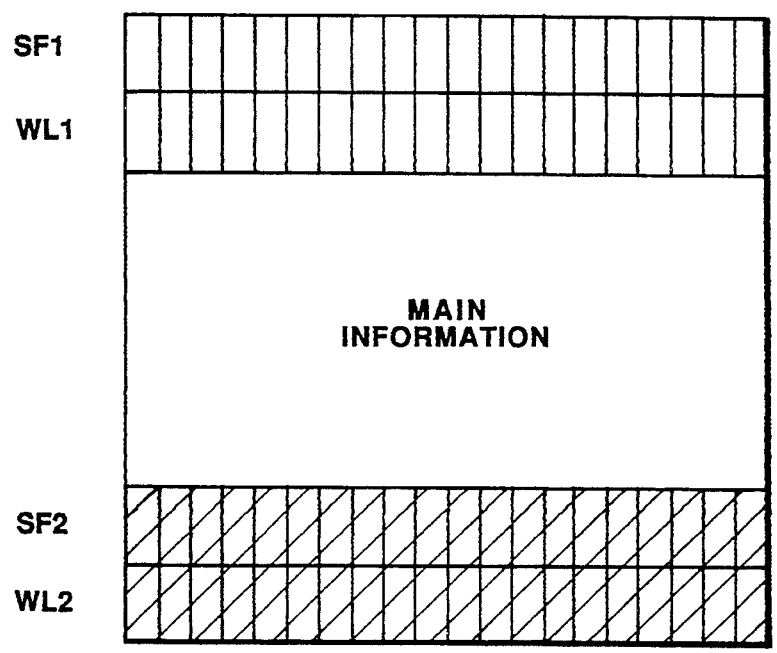
FIG. 15 is a diagrammatic view for illustrating the recording signal produced by a conventional data compressor.
Figure 16:
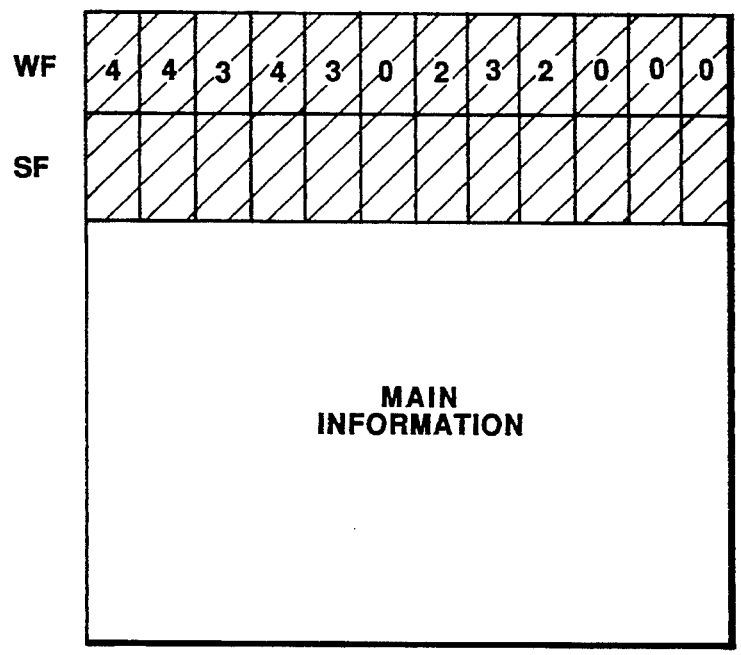
FIG. 16 is a diagrammatic view for illustrating the recording signal produced by a conventional system in which the number of block floating parameters is constant.
Figure 17:
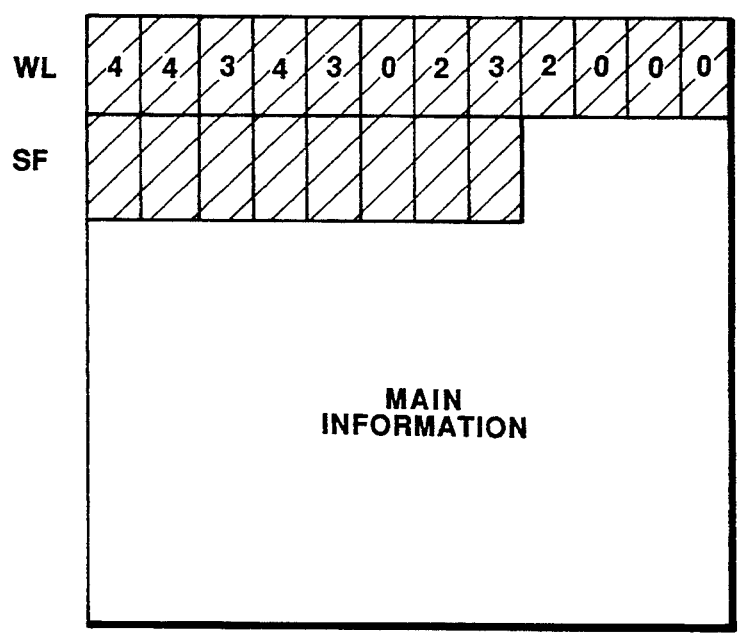
FIG. 17 is a diagrammatic view for illustrating the recording signal produced by a conventional system in which the number of block floating coefficients is variable.

FIG. 14 is a flow chart showing the signal processing in the complementary data expander shown in FIG. 5. In the data expander shown in FIG. 5, the flow chart can be carried out using the circuit blocks shown in FIG. 5, but it can also be carried out using a digital signal processor, and associated memories. The digital signal processor used for the data compressor of FIG. 3 can simply be reprogrammed, or the expander part of an compressor/expander program can be run.

In the flow chart of FIG. 14, the number N of block floating parameters BF is first read at step S11 by the block floating coefficient reading circuit 92. Then, at step S12, the number of block floating parameters BF indicated by the number N are read by the block floating parameter reading circuit 93. Then, at step S13, the quantized spectral coefficients QSP are read by the quantized spectral coefficient reading circuit 54 in response to the word length WL of the block floating parameters BF. At step S14, the spectral coefficient restoring circuit 55, in response to the block floating coefficients SF and the word length WL, restores the quantized spectral coefficients QSP as restored spectral coefficients RSP, which approximate the values of the original spectral coefficients SP in the data compressor (FIG. 3). Finally, at step S15, the inverse transform circuit 56 transforms the restored spectral coefficients RSP using an inverse MDCT (IMDCT), into three frequency range signals in the time domain and synthesizes them into a full frequency range digital output signal RTS.

In the above-described data compression method of the present invention, since the block floating parameters are recorded for each band up to the highest frequency band for which such parameters are needed, and information indicating the number of the block floating parameters recorded is also recorded for each frame, bit allocation may be adjusted without impairing the sound quality. That is, if the high frequency spectral coefficients are not recorded because they make no perceivable difference to the sound quality, the bits that would otherwise be allocated to the high frequency spectral coefficients may be allocated for quantizing the lower frequency spectral coefficients, which improves the sound quality. Moreover, occasional high level, high frequency spectral coefficients may be recorded without narrowing the bandwidth. This is because high levels of quantizing noise can be tolerated in the presence of high level, high frequency signals, so relatively few bits are required. Finally, little extra processing is required to carry out these operations.

Although a system for compressing spectral coefficients transformed from a time domain input audio signal has been described in the above explanations of the aspects of the present invention, the present invention may also be applied to a sub-band coding system in which the time domain signals are encoded after frequency division into sub-bands.

I claim:

1. A method for compressing a digital audio input signal to provide a recording signal, the method comprising the steps of:
dividing the input signal into frames comprising plural samples;
transforming each frame of plural samples into a block of spectral coefficients and dividing the block of spectral coefficients into plural bands, the plural bands including lower frequency bands, and a lowest frequency band;
applying block floating to the spectral coefficients in each band and generating a block floating coefficient for each band;
quantizing the spectral coefficients in each band with an adaptive number of bits to provide quantized spectral coefficients in each band, and generating a word length for each band;
adding a block of data derived from the block of spectral coefficients to the recording signal, the block of data derived from the block of spectral coefficients consisting of:
the quantized spectral coefficients,
a main word length for each band,
a main block floating coefficient for each band, and
a reserve word length at least for each of the lower frequency bands.

2. The method for compressing a digital audio input signal of claim 1, wherein, the step of quantizing the spectral coefficients in each band with an adaptive number of bits includes quantizing the spectral coefficients in each band using an additional number of bits, the additional number of bits being a number of bits equivalent to a sum of a first difference and a second difference,
the first difference being a difference between a number of bits required to provide a reserve word length for each band and a number of bits required to provide a reserve word length at least for each of the lower frequency bands, and
the second difference is a difference between a number of bits required to provide a reserve block floating coefficient for each band and a number of bits required to provide no reserve block floating coefficients.

3. The method for compressing a digital audio input signal of claim 1, wherein, in the step of adding a block of data derived from the block of spectral coefficients to the recording signal, the block of data derived from the block of spectral coefficients additionally consists of a reserve block floating coefficient for each of the lower frequency bands.

4. The method for compressing a digital audio input signal of claim 3, wherein
the step of quantizing the spectral coefficients in each band with an adaptive number of bits includes quantizing the spectral coefficients in each band using an additional number of bits, the additional number of bits being a number of bits equivalent to a sum of a first difference and a second difference,
the first difference being a difference between a number of bits required to provide a reserve word length for each band and a number of bits required to provide a reserve word length for each of the lower frequency bands, and
the second difference is a difference between a number of bits required to provide a reserve block floating coefficient for each band and a number of bits required to provide a reserve block floating coefficient for each of the lower frequency bands.

5. The method for compressing a digital audio input signal of claim 1, wherein the step of adding a block of data derived from the block of spectral coefficients to the recording signal includes the step of arranging the quantized spectral coefficients sequentially in the block of data derived from the block of spectral coefficients, beginning with the quantized spectral coefficients in the lowest frequency band.

6. The method for compressing a digital audio input signal of claim 5, wherein, the step of quantizing the spectral coefficients in each band with an adaptive number of bits includes quantizing the spectral coefficients in each band using an additional number of bits, the additional number of bits being a number of bits equivalent to a sum of a first difference and a second difference, the first difference being a difference between a number of bits required to provide a reserve word length for each band and a number of bits required to provide a reserve word length for each of the lower frequency bands, and the second difference is a difference between a number of bits required to provide a reserve block floating coefficient for each band and a number of bits required to provide no reserve block floating coefficients.

7. The method for compressing a digital audio input signal of claim 5, wherein, in the step of adding a block of data derived from the spectral coefficients to the recording signal, the block of data derived from the block of spectral coefficients consists of:

the quantized spectral coefficients,
a main word length for each band,
a main block floating coefficient for each band,
a reserve word length for each of a first number of the lower frequency bands, and
a reserve block floating coefficient for each of a second number of lower frequency bands, the second number of lower frequency bands being less than the first number of lower frequency bands.

8. The method for compressing a digital audio input signal of claim 7, wherein, the step of quantizing the spectral coefficients in each band with an adaptive number of bits includes quantizing the spectral coefficients in each band using an additional number of bits, the additional number of bits being a number of bits equivalent to a sum of a first difference and a second difference, the first difference being a difference between a number of bits required to provide a reserve word length for each band and a number of bits required to provide a reserve word length for each of the first number of lower frequency bands, and the second difference is a difference between a number of bits required to provide a reserve block floating coefficient for each band and a number of bits required to provide a reserve block floating coefficient for each of the second number of lower frequency bands.

9. The method for compressing a digital audio input signal of claim 1, wherein, in the step of adding a block of data derived from the block of spectral coefficients to the recording signal, the block of data derived from the block of spectral coefficients consists of:

the quantized spectral coefficients,
a main word length for each band,
a main block floating coefficient for each band,
a reserve word length for each band, and
a reserve block floating coefficient for each of the lower frequency bands.

10. The method for compressing a digital audio input signal of claim 9, wherein the step of quantizing the spectral coefficients in each band with an adaptive number of bits includes quantizing the spectral coefficients in each band using an additional number of bits, the additional number of bits being a number of bits equivalent to a difference between a number of bits required to provide a reserve block floating coefficient for each band and a number of bits required to provide a reserve block floating coefficient for each of the lower frequency bands.

11. A method for compressing a digital audio input signal to provide a recording signal, the method comprising the steps of:

dividing the input signal into frames comprising plural samples;

transforming each frame of plural samples into a block of spectral coefficients and dividing the block of spectral coefficients into plural bands, the plural bands including a lowest frequency band, and a highest frequency band;

generating block floating parameters;

applying block floating to the spectral coefficients in each band in response to a block floating parameter;

quantizing the spectral coefficients in each band with an adaptive number of bits to provide quantized spectral coefficients in response to a block floating parameter, zero bits being allocated to the spectral coefficients in bands higher in frequency than a highest usable band;

adding a block of data derived from the block of spectral coefficients to the recording signal, the block of data derived from the block of spectral coefficients consisting of:

the quantized spectral coefficients for each band up to the highest usable band, there being a number of bands up to the highest useable band, block floating parameters for each band up to the highest useable band, and data indicating the number of bands up to the highest usable band.

12. The method for compressing a digital audio input signal of claim 11, wherein, the step of quantizing the spectral coefficients in each band with an adaptive number of bits includes quantizing the spectral coefficients in each band using an additional number of bits, the additional number of bits being a number of bits equivalent to a difference between a number of bits required to provide block floating parameters for each band and a number of bits required to provide block floating parameters for each band up to the highest useable band.

13. The method for compressing a digital audio input signal of claim 11, wherein the block floating parameters include a word length and a block floating coefficient, the step of applying block floating includes the step of applying block floating in response to the block floating coefficient, the step of quantizing the spectral coefficients includes the step of quantizing the spectral coefficients in response to the word length, and in the step of adding a block of data derived from the block of spectral coefficients to the recording signal, the block floating parameters in block of data derived from the block of spectral coefficients consist of:

a main word length for each band up to the highest useable band, a main block floating coefficient for each band up to the highest useable band, and a reserve word length for each of the lower frequency bands.

14. The method for compressing a digital audio input signal of claim 13, wherein in the step of adding a block of data derived from the block of spectral coefficients to the recording signal, the block floating parameters in block of data derived from the block of spectral coefficients additionally consist of a reserve block floating coefficient for each of the lower frequency bands.

15. The method for compressing a digital audio input signal of claim 13, wherein the step of adding a block of data derived from the block of spectral coefficients to the recording signal includes the step of arranging the quantized spectral coefficients sequentially in the block of data derived from the block of spectral coefficients, beginning with the quantized spectral coefficients in the lowest frequency band.

16. The method for compressing a digital audio input signal of claim 15, wherein, in the step of adding a block of data derived from the block of spectral coefficients to the recording signal, the block floating parameters in block of data derived from the block of spectral coefficients consist of:
- a main word length for each band up to the highest useable band,
- a main block floating coefficient for each band up to the highest useable band,
- a reserve word length for each of a first number of the lower frequency bands, and
- a reserve block floating coefficient for each of second number of lower frequency bands, the second number of lower frequency bands being less than the first number of lower frequency bands.

17. An apparatus for compressing a digital audio input signal to provide a recording signal, the apparatus comprising:
- a means for dividing the input signal into frames comprising plural samples;
- a means for transforming each frame of plural samples into a block of spectral coefficients and for dividing the block of spectral coefficients into plural bands, the plural bands including lower frequency bands;
- a means for applying block floating to the spectral coefficients in each band and for generating a block floating coefficient for each band;
- a quantizing means for quantizing the spectral coefficients in each band with an adaptive number of bits to provide quantized spectral coefficients in each band, and for generating a word length for each band;
- a means for adding a block of data derived from the block of spectral coefficients to the recording signal, the block of data derived from the block of spectral coefficients consisting of:
  the quantized spectral coefficients,
  a main word length for each band,
  a main block floating coefficient for each band, and
  a reserve word length at least for each of the lower frequency bands.

18. The apparatus for compressing a digital audio input signal of claim 17, wherein, the quantizing means is for quantizing the spectral coefficients in each band with an adaptive number of bits using an additional number of bits, the additional number of bits being a number of bits equivalent to a sum of a first difference and a second difference,
the first difference being a difference between a number of bits required to provide a reserve word length for each band and a number of bits required to provide a reserve word length for each of the lower frequency bands, and
the second difference is a difference between a number of bits required to provide a reserve block floating coefficient for each band and a number of bits required to provide no reserve block floating coefficients.

19. The apparatus for compressing a digital audio input signal of claim 17, wherein, the block of data derived from the block of spectral coefficients additionally consists of a reserve block floating coefficient for each of the lower frequency bands.

20. The apparatus for compressing a digital audio input signal of claim 19, wherein, the quantizing means is for quantizing the spectral coefficients in each band with an adaptive number of bits using an additional number of bits, the additional number of bits being a number of bits equivalent to a sum of a first difference and a second difference,
the first difference being a difference between a number of bits required to provide a reserve word length for each band and a number of bits required to provide a reserve word length for each of the lower frequency bands, and
the second difference is a difference between a number of bits required to provide a reserve block floating coefficient for each band and a number of bits required to provide a reserve block floating coefficient for each of the lower frequency bands.

21. The apparatus for compressing a digital audio input signal of claim 17, wherein the adding means includes a means for arranging the quantized spectral coefficients sequentially in the block of data derived from the block of spectral coefficients, beginning with the quantized spectral coefficients in the lowest frequency band.

22. The apparatus for compressing a digital audio input signal of claim 21, wherein,
the quantizing means is for quantizing the spectral coefficients in each band with an adaptive number of bits using an additional number of bits, the additional number of bits being a number of bits equivalent to a sum of a first difference and a second difference,
the first difference being a difference between a number of bits required to provide a reserve word length for each band and a number of bits required to provide a reserve word length for each of the lower frequency bands, and
the second difference is a difference between a number of bits required to provide a reserve block floating coefficient for each band and a number of bits required to provide no reserve block floating coefficients.

23. The apparatus for compressing a digital audio input signal of claim 21, wherein the block of data derived from the block of spectral coefficients consists of:
- the quantized spectral coefficients,
- a main word length for each band,
- a main block floating coefficient for each band,
- a reserve word length for each of a first number of the lower frequency bands, and
- a reserve block floating coefficient for each of a second number of lower frequency bands, the second number of lower frequency bands being less than the first number of lower frequency bands.

24. The apparatus for compressing a digital audio input signal of claim 23, wherein, the quantizing means is for quantizing the spectral coefficients in each band with an adaptive number of bits using an additional number of bits, the additional number of bits being a number of bits equivalent to a sum of a first difference and a second difference, the first difference being a difference between a number of bits required to provide a reserve word length for each band and a number of bits required to provide a reserve word length for each of the first number of lower frequency bands, and the second difference is a difference between a number of bits required to provide a reserve block floating coefficient for each band and a number of bits required to provide a reserve block floating coefficient for each of the second number of lower frequency bands.

25. The apparatus for compressing a digital audio input signal of claim 17, wherein the block of data derived from the block of spectral coefficients consists of:
the quantized spectral coefficients,
a main word length for each band,
a main block floating coefficient for each band,
a reserve word length for each band, and
a reserve block floating coefficient for each of the lower frequency bands.

26. The apparatus for compressing a digital audio input signal of claim 25, wherein the quantizing means quantizes the spectral coefficients in each band with an adaptive number of bits using an additional number of bits, the additional number of bits being a number of bits equivalent to a difference between a number of bits required to provide a reserve block floating coefficient for each band and a number of bits required to provide a reserve block floating coefficient for each of the lower frequency bands.

27. An apparatus for compressing a digital audio input signal to provide a recording signal, the apparatus comprising:
a means for dividing the input signal into frames comprising plural samples;
a means for transforming each frame of plural samples into a block of spectral coefficients and for dividing the block of spectral coefficients into plural bands, the plural bands including lower frequency bands, and a lowest frequency band;
a means for generating block floating parameters;
a block floating means for applying block floating to the spectral coefficients in each band in response to a block floating parameter;
a quantizing means for quantizing the spectral coefficients in each band with an adaptive number of bits to provide quantized spectral coefficients in response to a block floating parameter, the quantizing means allocating zero bits to the spectral coefficients in bands higher in frequency than a highest usable band;
a means for adding a block of data derived from the block of spectral coefficients to the recording signal, the block of data derived from the block of spectral coefficients consisting of:
the quantized spectral coefficients for each band up to the highest usable band, there being a number of bands up to the highest useable band,
block floating parameters for each band up to the highest useable band, and
data indicating the number of bands up to the highest usable band.

28. The apparatus for compressing a digital audio input signal of claim 27, wherein the quantizing means is for quantizing the spectral coefficients in each band with an adaptive number of bits using an additional number of bits, the additional number of bits being a number of bits equivalent a difference between a number of bits required to provide block floating parameters for each band and a number of bits required to provide block floating parameters for each band up to the highest useable band.

29. The apparatus for compressing a digital audio input signal of claim 27, wherein
the block floating parameters include a word length and a block floating coefficient,
the block floating means applies block floating in response to the block floating coefficient,
the quantizing means quantizes the spectral coefficients in response to the word length, and
the block floating parameters in block of data derived from the block of spectral coefficients consist of:
a main word length for each band up to the highest useable band,
a main block floating coefficient for each band up to the highest useable band, and
a reserve word length for each of the lower frequency bands.

30. The apparatus for compressing a digital audio input signal of claim 29, wherein the block floating parameters in block of data derived from the block of spectral coefficients additionally consist of a reserve block floating coefficient for each of the lower frequency bands.

31. The apparatus for compressing a digital audio input signal of claim 29, wherein the adding means includes a means for arranging the quantized spectral coefficients sequentially in the block of data derived from the spectral coefficients, beginning with the quantized spectral coefficients in the lowest frequency band.

32. The apparatus of claim 31, wherein the block floating parameters in block of data derived from the block of spectral coefficients consist of:
a main word length for each band up to the highest useable band,
a main block floating coefficient for each band up to the highest useable band,
a reserve word length for each of a first number of lower frequency bands
a reserve block floating coefficient for each of a second number of the lower frequency bands, the second number of the lower frequency bands being less than the first number of the lower frequency bands.

* * * * *